M. O. CROSS.
GEAR TOOTH ROUNDER.
APPLICATION FILED MAR. 3, 1917.

1,279,278.

Patented Sept. 17, 1918.
4 SHEETS—SHEET 1.

Inventor
Milton O. Cross

By Charles E. Himes
Atty.

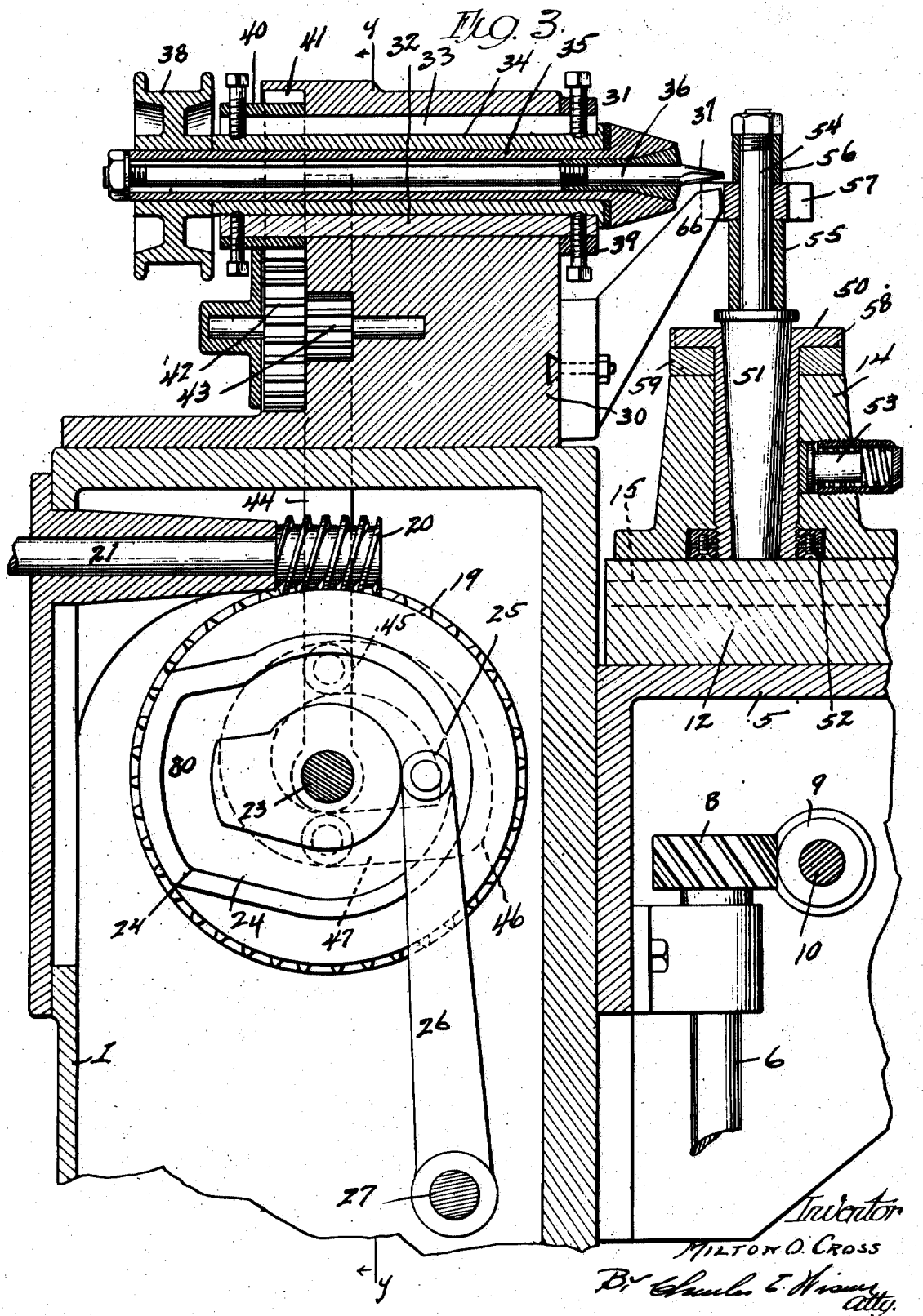

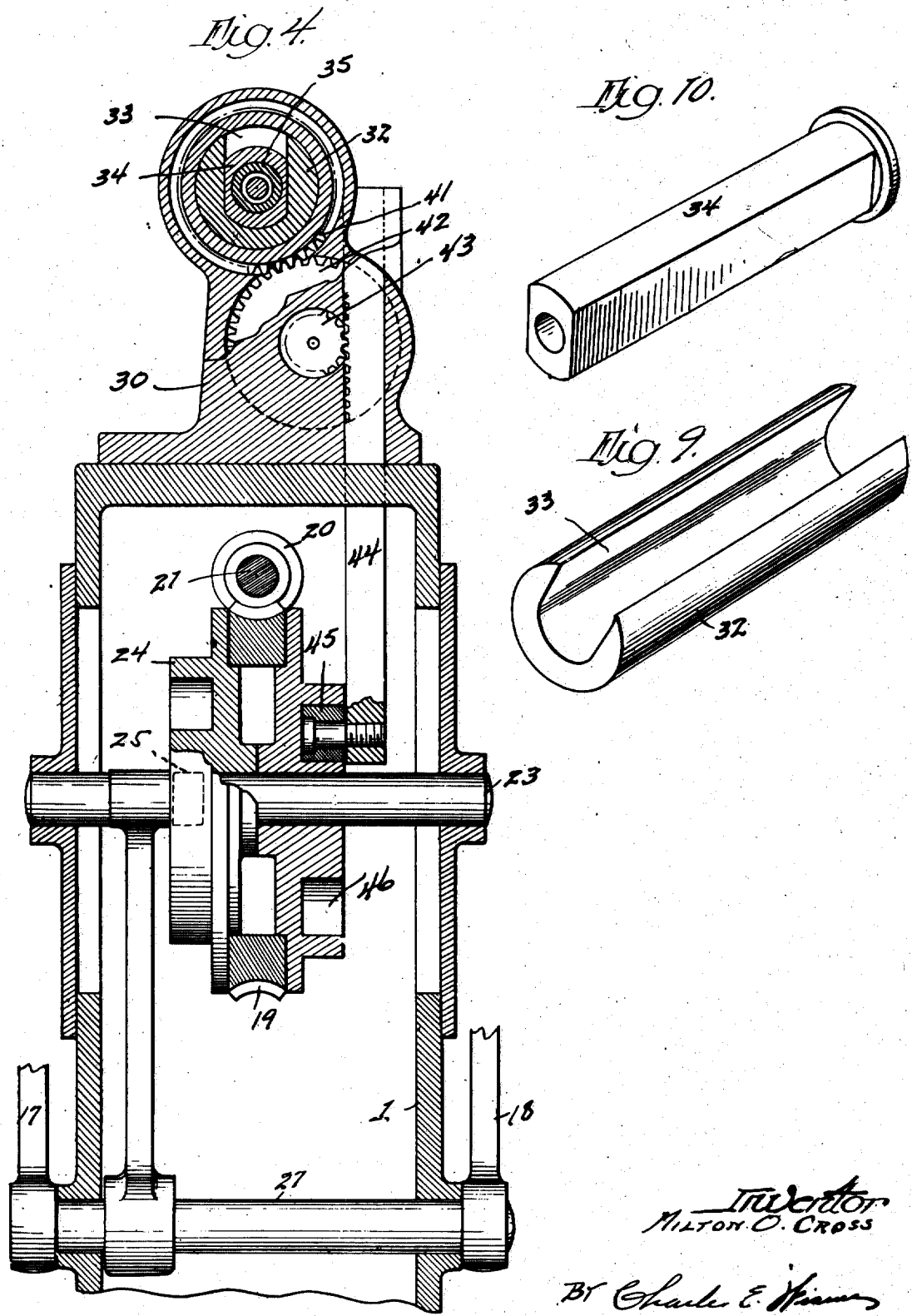

M. O. CROSS.
GEAR TOOTH ROUNDER.
APPLICATION FILED MAR. 3, 1917.
1,279,278.
Patented Sept. 17, 1918.
4 SHEETS—SHEET 4.
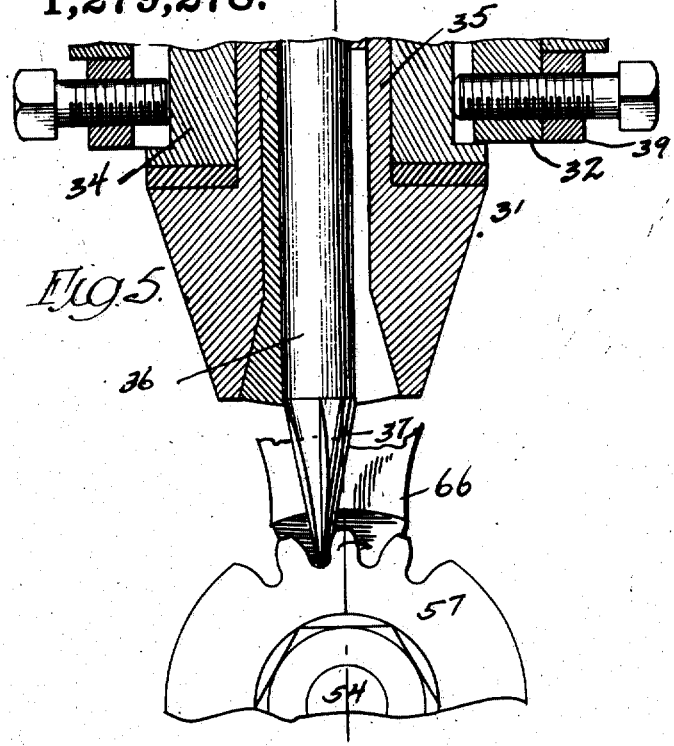
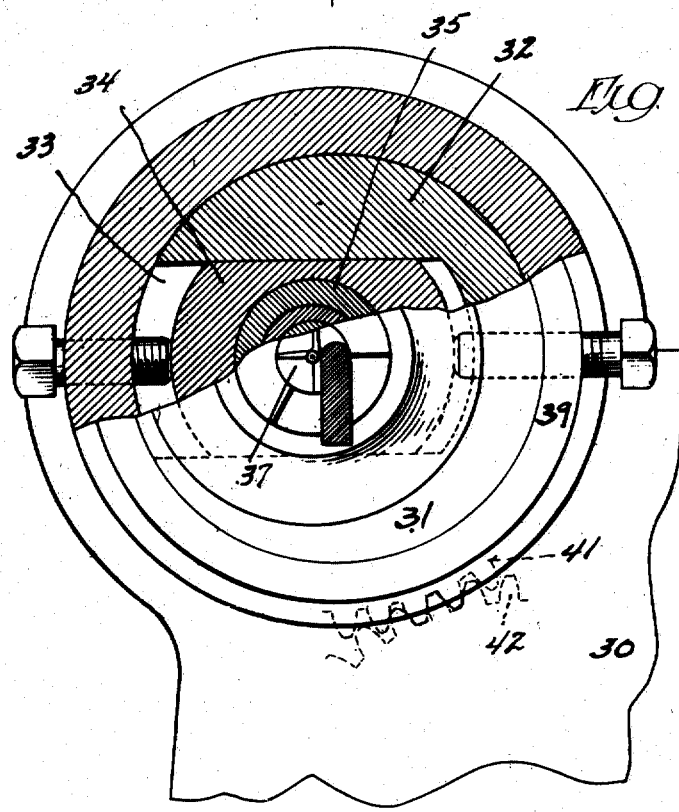
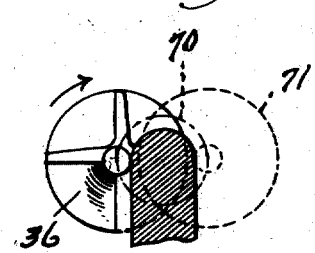
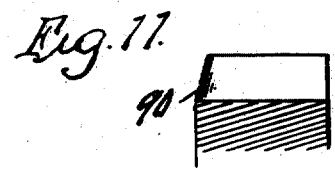
Inventor
MILTON O. CROSS
By Charles E. Hiner
Attys

UNITED STATES PATENT OFFICE.

MILTON O. CROSS, OF DETROIT, MICHIGAN.

GEAR-TOOTH ROUNDER.

1,279,278.  Specification of Letters Patent.  Patented Sept. 17, 1918.

Application filed March 3, 1917. Serial No. 152,274.

*To all whom it may concern:*

Be it known that I, MILTON O. CROSS, a citizen of the United States, residing at Detroit, county of Wayne, State of Michigan, have invented a certain new and useful Improvement in Gear-Tooth Rounders, and declare the following to be a full, clear, and exact description of the same, such as will enable others skilled in the art to which it pertains to make and use the same, reference being had to the accompanying drawings, which form a part of this specification.

This invention relates to gear tooth rounding machines and its object is a simple and efficient device for rounding the ends of the teeth of spur gears such as are used for instance, in sliding gear transmissions where the gears are moved on their longitudinal axes into mesh one with the other.

Heretofore in devices for this purpose the rounding of the tooth has not been perfect in that the tooth is rounded during movement thereof. In such former devices, the tooth on first engaging the cutting tool moves toward the direction of movement of the tool and as the tooth passes the center of the tool the remainder of the cut is made while the tooth is moving away from the tool resulting in an imperfectly rounded tooth.

A particular object of this invention is a device in which the tooth or gear is held stationarily and the tool moved about the end thereof during the cutting movement in a path corresponding to the desired final form of the tooth. A further object of the invention is a machine provided with a cutting tool operating as above outlined and that is adapted for adjustment whereby teeth of various sizes may be rounded or cut to the desired form on the end. Another object of the invention is a machine of the character stated adaptable for use in cutting the ends of teeth of gears of various pitches and sizes, the gear being fixedly held during the cutting operation at the finish of which the gear is removed from contact with the cutting tool and indexed and returned to position for operating on a succeeding tooth, the cutter rotating on its axis and being turned in a path concentric to the axis thereof during the cutting operation to dress the tooth in a manner hereinafter described.

Other objects of the invention are involved in the mechanism by which the tool is made to traverse the peculiar path stated and also in the mechanism for indexing the gear and for holding the gear during operation thereon all of which is hereinafter more fully described and claimed and shown in the accompanying drawings in which—

Fig. 3 is a vertical section taken on line $x$—$x$ of Fig. 2 showing a cutting tool and means of operation thereof.

Fig. 4 is a vertical section taken on line $y$—$y$ of Fig. 3.

Fig. 5 is an enlarged plan view showing the cutter in engagement with a tooth at the beginning of the cutting operation.

Fig. 6 is a similar view showing the tool at the completion of the cutting operation.

Fig. 7 is a front elevation of the cutting tool showing its relation to a gear tooth.

Fig. 8 is a similar view showing the tool only and its path of movement about the end of a gear tooth.

Fig. 9 is a detail of a part of the mechanism for holding the cutting tool.

Fig. 10 is a detail showing the tool housing.

Figure 1:
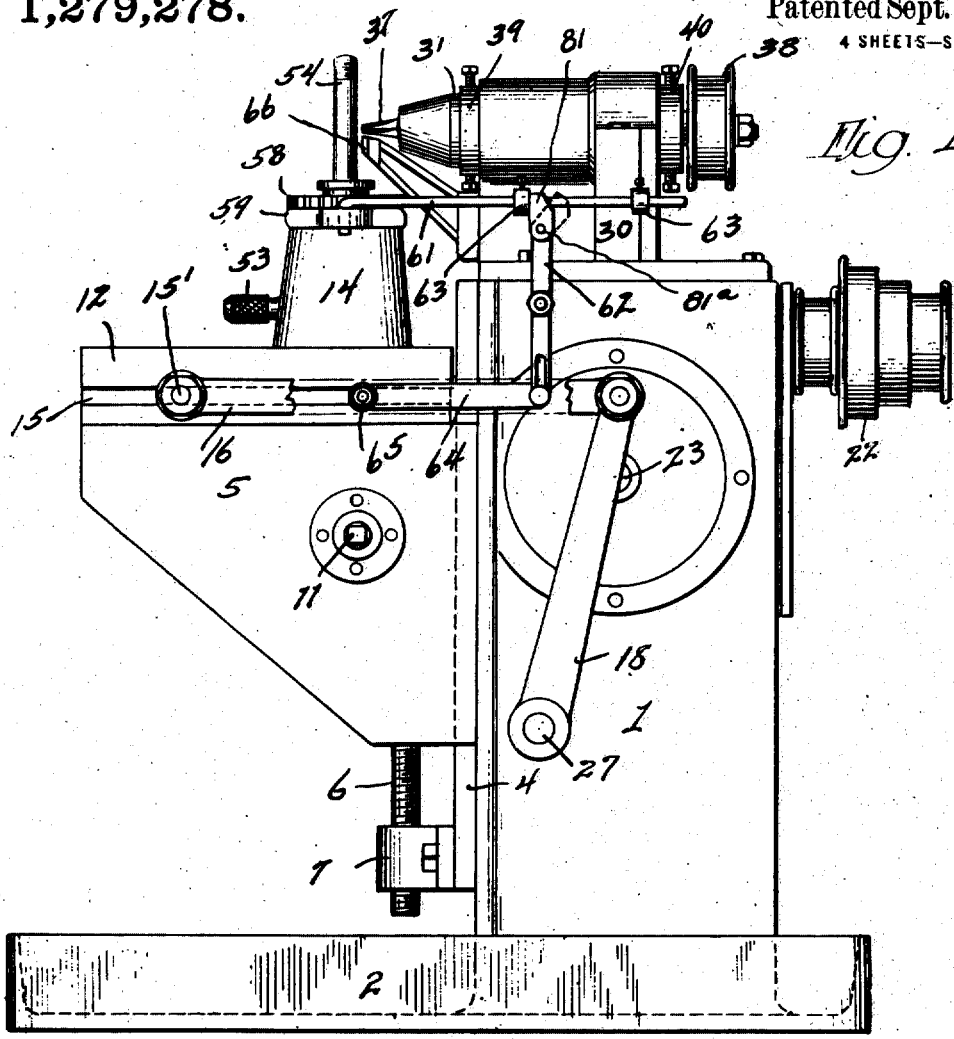
Figure 1 is a side elevation of the tooth rounding machine embodying my invention.

Fig. 11 indicates the tooth end after being rounded.

Similar characters refer to similar parts throughout the drawing and specification.

The device consists of a main box like frame 1 mounted on a base 2 which may be of any desired form preferably pan shaped as shown to catch the cuttings and oil drippings from the machine. The frame member 1 on the front side thereof is provided with ways 3 and 4, on which rides a vertically movable member 5 as will be readily understood, adjustable by means of a screw shaft 6 engaging a nut 7 secured to the member 1 as will be seen in Fig. 1. On the upper end of the shaft 6 is a spiral gear 8 secured to the interior of the member 5. This gear 8 meshes with a similar gear 9 on a cross shaft 10 which extends to the outside of the machine and, as indicated at 11 in Fig. 1, may be supplied with a crank whereby the vertical position of the slide member 5 may be varied or adjusted. The upper horizontal face of the vertically sliding member 5 is provided with ways as will be understood from Figs. 1 and 3 in which a table 12 is horizontally movable. This table, as will be understood from Fig. 2, also has ways running longitudinally thereof in which the bolts 13 engage. These bolts secure the rotatable gear supporting head 14 in the desired position on the table 5, which position is determined by the diameter of the gear to be operated upon. With a large gear this head 14 is set toward the back end of the table and with a smaller gear as is shown in Fig. 3 the head is set near the forward end of the table.

Figure 2:
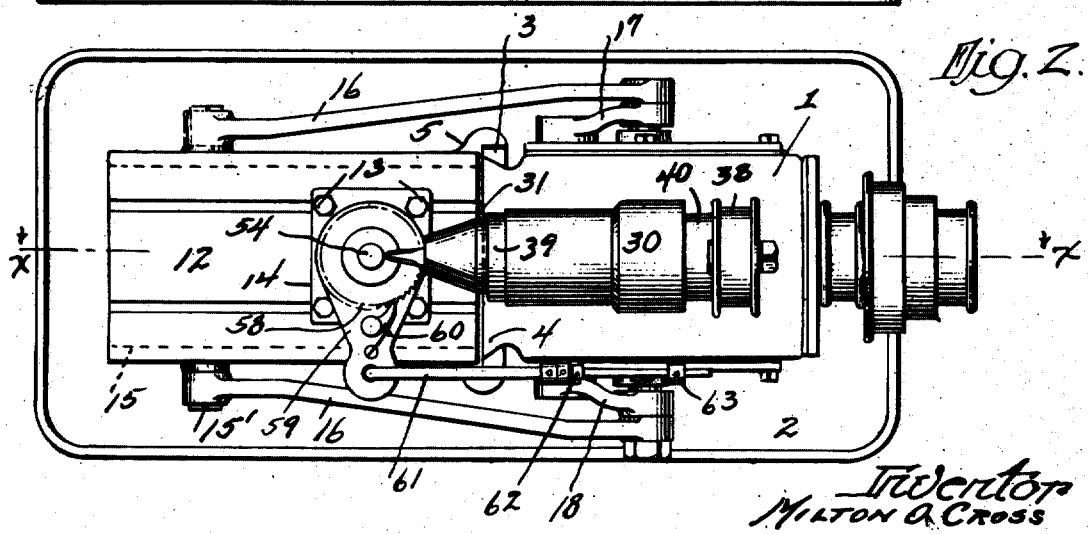
Fig. 2 is a plan view thereof.

The table 12 is also provided with ways 15 on each edge thereof as will be understood from Fig. 1 in which the heads of bolts 15' are positioned to which bolts on each side of the table is secured a pitman 16 as will be understood from Fig. 2. These pitmen are connected at the opposite ends to the end of the rock arms 17 and 18 on opposite sides respectively of the machine and by movement of these rock arms the table 12 is made to travel backward and forward on the member 5. On the interior of the main frame is a worm wheel 19 driven by a worm 20 on the main drive shaft 21 extending out through the back of the machine and provided with belt wheels 22, as will be seen in Fig. 1. The worm wheel 19 is mounted on a shaft 23 and on this is an internal cam 24 engaged by a roller 25 on the end of a rock arm 26 which is secured to a shaft 27. This shaft 27 extends through the main frame 1 and the rock arms 17 and 18 are secured on opposite ends thereof as will be understood from Fig. 2. During each revolution of the shaft 23 the table 12 is moved to and fro in correct relation with the other operating parts of the mechanism hereinafter described.

On the top of the frame member 1 is mounted the tool support 30 as will be understood from Figs. 3 and 4. The upper end of this head or support 30 is bored out to receive the tool head proper 31. This tool head consists of a cylindrical holder 32 having a U shaped channel 33 cut longitudinally therein. This holder is adapted to receive a housing 34 centrally bored to receive the tool bearing 35, as will be understood from Figs. 3, 4 and 10. The cutting tool 36 is in the shape of a rod or shaft having a tapered cutting end 37 positioned centrally within the bearing 35 as will be seen in Figs. 3 and 4. This bearing 35 extends outward at the rear beyond the end of the housing 34 and is provided with a belt wheel 38 adapted to rotate the bearing and cutter carried thereby. A ring 39 is secured about the forward end of the holder 32 and set screws are there provided engaging the housing 34 which rests in the U shaped slot and positions the housing relative to the center of rotation of the holder 32. Likewise at the rear end of the bearing is provided a ring 40 having set screws to likewise position the rear end of the housing in the U shaped holder. This ring 40 extends into the head 30 which is recessed to receive it and is provided with a spur gear 41 cut thereon engaging with a spur gear 42 mounted in the tool support 30. On the shaft of this gear 42 is also a small gear 43 and the gear 43 is engaged by a rack 44 movable vertically in a way provided in the tool support. The lower end of the rack carries a roller 45 engaging an undercut cam 46 rotatable with the worm wheel 19. This cam has a shape as shown by dotted lines in Fig. 3 and by movement of the rack the housing 34 and holder 32 are rotated in the central bore of the head. The tool, as will be noted, is independently rotated by the belt wheel 38 for the cutting operation and the entire support is moved forward and backward on its axis once during each revolution of the shaft 23 and worm wheel 19 so that the tool is moved on an arc whose center is on the axis of rotation of the holder. It is to be noted that the cam 46 is shaped to give a slow movement during part of its revolution and a quick return due to the straight portion 47 formed therein, the purpose of which will be later described. It is further to be noted that the tool 37 is shown in Figs. 3 and 4 as being so positioned that the axis thereof coincides with the axis of the holder, and that the tool may be moved from such center or neutral position outwardly from the axis of the holder and thus, during oscillation of the holder, traverse an arc of greater or less radius as may be required by the size of the tooth or work to be operated on.

The gear supporting head 14 heretofore mentioned has an outer shell or case secured to the sliding member 5 by the bolts 13 as described. This outer case has a vertical bore therein in which is mounted a retainer 50 for a spindle 51 which is preferably tapered in form as shown and thus engages securely in the retainer. The retainer at the lower end is provided with lock nuts 52 to position the same in the head 14 and a spring pressed plug 53 is provided in the side of the spindle holder to frictionally hold the retainer 50 from accidental revolution. The spindle 51 terminates at the upper end in a rod 54 threaded at the upper end to receive a nut and tubular spacing members 55 and 56 are used on the lower and upper sides of the gear 57 by means of which the gear is securely held between the spacers. The retainer 50 is flanged at the upper end and the peripheral edge of the flange is toothed as indicated at 58. Revolubly mounted on the spindle or retainer and beneath the flange thereof, as will be understood from Figs. 1 and 3, is a plate 59 having a spring restrained pawl 60 on the upper surface thereof which engages the teeth 58 of the retainer. This plate 59 extends outwardly from the center of rotation of the spindle 51 as will be understood from Fig. 2 and a rod 61 engages therein, which rod rides in the upper end of a lever 62 pivotally mounted on the upper end of the frame 1. The rod is provided with movable blocks 63 thereon, whose function is to engage the upper end of the pivoted lever during movement of the gear supporting head 14 with the table 12. This engagement of the blocks with the upper end of the pivoted lever serves to oscillate the plate 59 on the spindle and the pawl 60 being turned backward relative to the ratchet 58 of the retainer as the head 14 and table 12 are moved toward the cutting tool, and as the table and head are moved outwardly therefrom the plate is turned in the opposite direction by reason of the rear block 63 engaging in the end of the pivoted lever. The extent of movement is determined by the distance between the blocks and movement of the pivoted lever. Further adjustment may be secured by providing the upper end of the pivoted lever 62 with a pivoted yoke 81 held by a clamping screw 81ª and the angle of this head 81 may be altered as indicated by dotted lines in order that the blocks may strike the same sooner or later during the movement of the table 12. This lever 62 is connected by means of a link 64 and a bolt 65 with the side of the table 12, the bolt being removably secured in the way 15 on the side thereof behind the link or bar 16 as will be understood from Fig. 1. This bolt may be set in various positions in the side depending upon the position of the head required by the size of the gear to be operated upon. By means of this link connection 64 and pivoted lever 62, as the head moves outward away from the cutting tool the upper end of the lever 62 is moved backward to engage the rear block 63 and by this arrangement of the lever 62 and rod 61 and ratchet and pawl and plate 59, adjustment may be made to index any ordinary gear. The parts are positioned to turn the gear one tooth each movement of the table and gear away from the cutting tool or at about the completion of the movement thereof as the gear remains set during the interval of withdrawing from engagement with the cutting tool which is allowed for by the spacing of the movable blocks 63. As the gear is again brought to engage the cutting tool, a tooth thereof is engaged by the sector 66 positioned to engage between the teeth while being operated upon by the tool as will be understood more particularly in Fig. 5. This sector 66 is carried on the tool support 30 as will be readily understood from Fig. 3 and is shaped at the end to conform to the shape of the space between the teeth of the gear and, being at a distance from the center of rotation of the gear, holds the gear fixedly in position during the cutting operation.

The cutting operation is shown in Figs. 5 to 8 inclusive. In Figs. 5 and 6, which are plan views of the cutting tool, is shown a gear being operated upon thereby, and Fig. 7 is a face or end view of the cutting tool showing a tooth being operated upon. It is to be borne in mind that the cutting tool operates on the end of the tooth and not on the face thereof which is intended to intermesh with another gear and, by rounding or chamfering the end of the teeth, the gear is adapted to be readily moved longitudinally into mesh with a corresponding gear the ends of the teeth of which are likewise rounded. By reason of the cone shape of the tool, the end of the gear teeth will be cut back to a greater extent at the free edge than at the base as will be understood from Fig. 11 in which the rounded end of the tooth is indicated at 90.

The movement of the cutter during operation is from right to left as is indicated by the arrow in Fig. 5 which shows the beginning of the operation. The cutting tool is continuously driven by the belt wheel 38 as heretofore described so that it rotates at the proper rate of speed on its own axis. This cutting tool is carried by a holder 34 which is positioned in the head 32 eccentric to the axis of rotation thereof. Therefore, the cutting tool has two motions, one upon its own axis and one about and concentric to the axis of rotation of the head 32. The cutting tool thus starts in one side of the end of the tooth as shown in Fig. 8 and rotates about the axis of the dotted circle 70 whose center is usually on an imaginary line equidistant from the two sides of the tooth. On being brought to engage the cutting tool, the gear is held by the sector 66 and is thus held immovable during the cutting operation. The cutting tool thus passes from the position shown in full lines in Fig. 8 to the position shown by the dotted circle 71 and making a perfectly rounded edge or end on the tooth.

The sector is bolted to the base 30 of the tool holder as is indicated in the drawing, the bolts passing through slots in the base of the sector 66, as indicated in section in Fig. 3, the heads being tapered to engage in a way in the bearing to allow the sector to be moved relative to the vertical center of the gear. The purpose of this sector is to set the tooth of the gear engaged thereby in the desired relation to the tool so that the axis about which the tool is turned may pass through the center of the tooth as above mentioned. This position of the sector and the resultant cutting of the end of the tooth is used in all cases where it is desired to round the tooth on both sides alike. However, in the event that only one side of the tooth is required to be rounded, the sector should be so set that one side of the tooth is on this imaginary line passing through the axis of rotation of the holder 32. In such case the tool reaches its height of movement concentric to the axis of rotation of the holder 32 when the axis of rotation of the tool is in a vertical plane with the axis of rotation of the holder and the tooth is cut or rounded on the one side only.

The extent of the cut is also determined by the vertical position of the gear which is adjustable by means of the gears 8 and 9 and screw shaft 6. By setting the gear at the proper height it will be seen that the ends of the tooth may be operated upon just sufficiently to remove the bur therefrom formed by the gear cutting tool touching only each corner of the end of the tooth as it passes from one side to the other. Also with the positioning of the gear to cut upon one side of the tooth only the opposite corner or edge of the end of the tooth may be actually untouched while the opposite corner is fully rounded which effect is produced by positioning the gear tooth relative to the cutting tool by adjustment of the sector above described. The tool is made to take the described eccentric path by reason of the form of the cam 46, roller 45 engaging therein and rack 44 which meshes with the gear 43 rotating the gear 42 on the head. As will be understood from the form of the two cams shown by the full and dotted lines respectively in Fig. 3, the cam 24 shown by full lines holds the gear in position and in engagement with the sector during the operation and eccentric movement of the tool about the end of the tooth. The form of the cam 46 is such that the cutting movement is slow—that is, the rack 44 is moved slowly and consequently, the rotation of the tool head 32 is correspondingly slow. As the tool completes the operation on the gear tooth the straight portion of the cam 47 is engaged by the roller 45 of the rack and a quick return movement of the tool to original position is accomplished. During this quick return movement the table 12 is moved outwardly, by reason of the peculiar shape of the cam 24. The part 80 of the cam groove being at a greater distance from the axis of rotation and concentric with the remaining portions of the groove, the roller 25 in passing from the portions of the groove of short diameter to that of greater diameter, causes the quick return movement of the table. This movement also is comparatively quick occupying but a small portion of the circumference of the cam. During this movement backward and again to position with the cutting tool, the gear is indexed through operation of the indexing mechanism heretofore described which is adjustable by reason of the settling of the blocks 63 on the rod 61. As the gear is indexed the tool is set into operation on a succeeding tooth and these operations are continued until all of the teeth of a gear have been operated upon.

By fixedly holding the gear during the cutting operation, the end of the tooth is cut uniformly on both sides so far as mechanism will allow and the teeth are thus all perfectly formed on the end and a result is achieved that is impossible with those known machines in which the gears are moved during the cutting operation, the ordinary machines not producing a perfectly formed end on the tooth. It further becomes evident from the foregoing description that the machine is simple in construction and entirely automatic in operation and the parts operating in fixed relation one with the other. Even an unskilled person may keep the machine in operation upon gears of uniform size and it only requires the proper care in the adjusting of the machine for operation upon the gears of various diameters and pitches.

Having thus fully described my invention its utility and mode of operation what I claim and desire to secure by Letters Patent of the United States is—

1. In a machine of the character described, a gear holding device, a cutting tool for operating on the end of the gear tooth, means for intermittently bringing the gear to and from the tool with a tooth thereof presented for operation by the tool, means for fixedly holding the gear during the cutting operation, means for indexing the gear during the interval it is out of engagement with the cutting tool, and means for moving the tool about the end of the tooth in a circular path whose center is on an imaginary line passing through the longitudinal center of the tooth near the end.

2. In a machine of the character described, a gear holder, a cutting tool for operating on the end of a gear tooth, means for operating the tool, mechanism for intermittently bringing the gear to and from the cutting tool, means for fixedly holding the gear during the cutting operation, means for indexing the gear during the interval it is out of engagement with the cutting tool, means for moving the cutting tool about the end of a tooth in a circular path whose center is on a radial line from the center of the gear passing through the tooth equidistant from each side thereof, and means for adjusting the tool relative to said center of movement.

3. In a machine of the character described, a gear holder, a cutting tool for operating on the end of a gear tooth, mechanism for intermittently bringing the gear to and from the cutting tool, means including said mechanism for fixedly holding the gear during the cutting operation, indexing mechanism operable upon movement of the gear out of engagement with the cutting tool, means for operating the cutting tool, a holder for the tool, and means for oscillating the holder, the tool being positioned with the axis thereof eccentric to the axis of the holder.

4. In a machine of the character described, a rotatable cutting tool for operating on the end of a gear tooth, an oscillatable holder therefor, the cutting tool being adjustable toward or from the axis of the holder, and automatic means for oscillating the holder.

5. In a machine of the character described, a cutting tool for operating on the end of a gear tooth, the cutting tool being rotatable about its own axis and automatically oscillatable about an axis eccentric thereto, and means for positioning the gear for the cutting operation.

6. In a machine of the character described, a base, a member moving vertically thereon, a table slidable horizontally on said vertically movable member, a gear holder on said table adapted to be securely set in the desired position thereon, a cutting tool rotatably mounted on the base, means for continuously rotating the cutting tool, means for moving the table to bring the gear to and from the cutting tool, means operating at the time a gear tooth is brought into position with the tool to move the tool about the end of the tooth in a path whose center is on a radial line of the gear passing through the tooth, and means for indexing the gear while out of engagement with the tool.

7. In a machine of the character described, a base, a member movable vertically thereon, a table slidable horizontally on the vertical movable member, a gear holder on said table adapted to be set in various positions to accommodate gears of various diameters, a cutting tool rotatably mounted on the base, means for continuously rotating the cutting tool, mechanism for moving the table to bring the gear to and from the cutting tool, an oscillatable holder for the cutting tool, means whereby the tool may be set eccentric to the axis of oscillation of the holder, means for oscillating the holder at the time the gear tooth is brought into position with the tool, the gear being so positioned that the axis of rotation of the holder passes through the tooth, means for fixedly holding the gear while operated upon by the tool, and means for indexing the gear while out of engagement with the tool.

8. In a machine of the character described, a base, a member adapted to be adjusted vertically thereon, a table slidable horizontally on the vertically movable member, a gear holder on the table adapted to be set in various positions to accommodate gears of different diameters, a rotatable cutting tool, a tool holder mounted in the base and movable about its axis independently of the cutting tool, means whereby the tool may be set eccentric to the axis of the holder, a continuously rotatable cam, mechanism intermediate the cam and the table whereby rotation of the cam reciprocates the table to bring the gear to and from the cutting tool, a second cam continuously rotatable in fixed relation with the first named cam, mechanism including the second cam, and a rack and gear for rotating the tool holder, the relationship of the two cams being such that the tool holder is turned at the time the gear tooth is brought into engagement with the cutting tool, the gear being so positioned that the axis of the holder passes through the tooth, said first cam being so formed that, on completion of forward movement of the tool holder, by the second cam, the gear is withdrawn from engagement with the tooth and the cam then operates to return the tool and holder to original position, means for indexing the gear during the interval it is out of engagement with the tool, and means engaged by the gear on being brought to engagement with the tool for fixedly holding the gear while operated upon.

9. In a machine of the character described, a base, a member vertically adjustable thereon, a table horizontally slidable on the vertically adjustable member, a gear holder on the table adapted to be set at various positions to accommodate gears of different diameters, a rotatable cutting tool, a tool holder carried at the upper end of the base, and rotatable independently of the cutting tool, means whereby the tool may be set with the longitudinal axis thereof eccentric to the axis of rotation of the holder, the cutting face of the tool being substantially cone shaped, the angle of the side thereof relative to the axis of the tool corresponding to the angle of the side of a tooth relative to a radial line passing through the tooth equidistantly from each side thereof, the tooth being presented to the tool with the said radial line coinciding with the axis of rotation of the holder, means for rotating the holder at the time the tooth is presented to the tool whereby the tool is made to take a path about the end of the tooth to uniformly round the end thereof, and means for indexing the gear on movement of the table and gear away from the tool.

10. In a machine of the character described, a cutting tool, a gear holder, the tool being tapered to conform substantially to the angle of the side of a tooth, means for independently oscillating the tool during the cutting operation about an axis passing through the center of the gear and equidistantly from each side of the tooth, means for fixedly holding the gear during the cutting operation, and means for indexing the gear when retracted from engagement with the tool.

11. In a machine of the character described, a cutting tool rotatable about its own axis and adapted for operation upon the end of a gear tooth, a gear holder, means for turning the tool during the cutting operation about an axis eccentric to the axis of revolution of the tool, means for bringing the gear to and from the cutting tool, means for indexing the gear during the time it is out of engagement with the tool, and adjustable means for preventing movement of the gear during the cutting operation, the said gear holding means determining the position of the tooth relative to the tool.

12. In a machine of the character described, a cutting tool rotatable about its own axis and adapted for operation upon the end of a gear tooth, a gear holder, means for moving the holder to and from the cutting tool to present a tooth for operation by the tool and withdraw it therefrom, means for indexing the gear on withdrawal to present a succeeding tooth to the cutting tool, means for turning the tool during the cutting operation about an axis eccentric to the axis of revolution of the tool, means for adjusting the gear holder in a vertical plane to position the end of the tooth relative to the tool, and adjustable means for varying the position of the tooth in a horizontal plane relative to the cutting tool.

13. In a machine for rounding the ends of gear teeth, means for fixedly holding the gear during the cutting operation, a rotatable cutter, automatic means for oscillating the cutter during its rotation about the end of a tooth on an arc whose center is on a radial line passing from the gear center through the tooth equidistantly from each side thereof, and means for indexing the gear for successive operations.

14. In a machine for rounding the ends of gear teeth, a rotatable cutter, an oscillatable holder for the cutter, the cutter being adjustable toward or from the axis of oscillation of the holder, a gear support, adjustable means for positioning the support to present a gear tooth for operation by the cutter, said adjustable means being adapted to so position the tooth that a radial line passing from the center of the gear through the tooth equidistantly from each side thereof is in the vertical plane cutting the axis of oscillation of the holder or at an angle to the said plane, and means for varying the position of the gear and tooth vertically relative to the said axis of oscillation of the holder.

15. In a machine of the character described, a cutting tool for operating on the end of a gear tooth, the cutting tool being rotatable about its own axis and simultaneously oscillatable about an axis eccentric thereto, a gear holder, means for indexing the gear for successive operations, and automatic mechanism for oscillating the cutter about a tooth end subsequent to each indexing of the gear.

16. In a machine of the character described, a longitudinally tapered rotatable cutting tool, means for presenting a gear for operation by the tool with the end of the gear and teeth thereon in a plane parallel with the axis of rotation of the cutting tool, and means for oscillating the cutting tool about the end of a gear tooth to round the same, the shape of the tool forming the tooth end at an angle to the plane of the end of the gear.

17. In a machine of the character described, a rotatable cutting tool for operating on the end of a gear tooth, means for oscillating the tool on an axis eccentric to the axis of rotation, means for stationarily holding a gear with a tooth thereof in predetermined relation with the tool during the cutting operation, means for indexing the gear, and means for oscillating the tool in timed relation with the presentation of successive teeth by the indexing means.

In testimony whereof, I sign this specification.

MILTON O. CROSS.